United States Patent
Pietron et al.

(10) Patent No.: US 9,352,737 B2
(45) Date of Patent: May 31, 2016

(54) METHOD AND SYSTEM FOR OPERATING A HYBRID POWERTRAIN

(71) Applicant: Ford Global Technologies, LLC, Dearborn, MI (US)

(72) Inventors: Gregory Michael Pietron, Canton, MI (US); Alex O'Connor Gibson, Ann Arbor, MI (US); Seung-Hoon Lee, Northville, MI (US); Adam Nathan Banker, Plymouth, MI (US); James William Loch McCallum, Ann Arbor, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/647,170

(22) Filed: Oct. 8, 2012

(65) Prior Publication Data

US 2014/0100727 A1    Apr. 10, 2014

(51) Int. Cl.
| | |
|---|---|
| *B60W 20/00* | (2006.01) |
| *B60W 10/02* | (2006.01) |
| *B60W 10/06* | (2006.01) |
| *B60W 10/08* | (2006.01) |
| *B60W 30/18* | (2012.01) |
| *B60K 6/48* | (2007.10) |

(52) U.S. Cl.
CPC ............... *B60W 10/02* (2013.01); *B60W 10/06* (2013.01); *B60W 10/08* (2013.01); *B60W 20/40* (2013.01); *B60W 30/18045* (2013.01); *B60W 30/18172* (2013.01); *B60K 2006/4825* (2013.01); *B60W 2550/148* (2013.01); *B60W 2710/083* (2013.01); *B60W 2720/26* (2013.01); *Y02T 10/6252* (2013.01); *Y02T 10/6286* (2013.01); *Y10T 477/23* (2015.01); *Y10T 477/26* (2015.01)

(58) Field of Classification Search
CPC ......... B60L 11/02; B60K 17/356; B60K 6/26
USPC .......................................................... 701/22
See application file for complete search history.

(56) References Cited

U.S. PATENT DOCUMENTS 4,962,570 A * 10/1990 Hosaka et al. ................. 123/399
5,492,192 A    2/1996 Brooks et al.

(Continued)

FOREIGN PATENT DOCUMENTS

| JP | 2008068704 A | * | 3/2008 | ............ B60W 10/08 |
| JP | 2012116412 A | * | 6/2012 | ............ B60W 10/08 |

OTHER PUBLICATIONS

Jain, Amit K. et al., "Integrated Starter Generator for 42-V Powernet Using Induction Machine and Direct Torque Control Technique", IEEE Transactions on Power Electronics, vol. 21, No. 3, May 2006, pp. 701-710.*

(Continued)

*Primary Examiner* — Fadey Jabr
*Assistant Examiner* — Kevin P Mahne
(74) *Attorney, Agent, or Firm* — David Kelley; Alleman Hall McCoy Russell & Tuttle LLP

(57) ABSTRACT

A method and a system for improving operation of a hybrid vehicle are presented. In one example, operation of a hybrid driveline is adjusted in response to driving conditions that may cause wheel slip or a stuck vehicle. The approach may reduce driveline wear and improve vehicle drivability.

12 Claims, 6 Drawing Sheets

(56) References Cited

U.S. PATENT DOCUMENTS

| | | | | |
|---|---|---|---|---|
| 5,558,588 | A * | 9/1996 | Schmidt | 475/5 |
| 5,657,829 | A * | 8/1997 | May | 180/197 |
| 6,064,161 | A * | 5/2000 | Takahara | B60K 6/48 180/197 |
| 6,435,296 | B1 * | 8/2002 | Arai | 180/243 |
| 6,473,683 | B1 * | 10/2002 | Nada | 701/82 |
| 6,484,832 | B1 * | 11/2002 | Morisawa et al. | 180/65.225 |
| 6,508,739 | B1 * | 1/2003 | Bellinger | 477/62 |
| 6,549,840 | B1 * | 4/2003 | Mikami et al. | 701/69 |
| 6,550,595 | B2 * | 4/2003 | Kuczera | 192/48.3 |
| 6,726,596 | B2 * | 4/2004 | Kresse et al. | 477/116 |
| 6,827,661 | B2 * | 12/2004 | Fusegi et al. | 475/150 |
| 6,837,323 | B2 * | 1/2005 | Denton et al. | 180/65.26 |
| 6,907,337 | B2 * | 6/2005 | Phillips et al. | 701/51 |
| 6,909,959 | B2 * | 6/2005 | Hallowell | 701/88 |
| 6,941,218 | B2 | 9/2005 | Wolf et al. | |
| 7,160,223 | B2 | 1/2007 | Colvin | |
| 7,160,225 | B2 * | 1/2007 | Berger et al. | 477/5 |
| 7,222,014 | B2 | 5/2007 | Tao et al. | |
| 7,350,602 | B2 * | 4/2008 | Colvin et al. | 180/65.28 |
| 7,608,011 | B2 * | 10/2009 | Grabowski et al. | 477/5 |
| 7,792,628 | B2 * | 9/2010 | Aswani et al. | 701/103 |
| 7,810,592 | B2 * | 10/2010 | Klemen et al. | 180/65.225 |
| 7,894,958 | B2 | 2/2011 | Tate et al. | |
| 7,937,194 | B2 * | 5/2011 | Nasr et al. | 701/22 |
| 8,028,779 | B2 * | 10/2011 | Morishita et al. | 180/65.265 |
| 8,190,344 | B2 * | 5/2012 | Krueger et al. | 701/70 |
| 8,321,115 | B2 * | 11/2012 | Oral | 701/85 |
| 8,342,618 | B2 * | 1/2013 | Yanagida et al. | 303/151 |
| 8,442,735 | B2 * | 5/2013 | Hrovat et al. | 701/70 |
| 8,494,702 | B2 * | 7/2013 | Sah et al. | 701/22 |
| 8,565,990 | B2 * | 10/2013 | Ortmann et al. | 701/67 |
| 8,612,080 | B2 * | 12/2013 | Steuernagel et al. | 701/22 |
| 2002/0188789 | A1 * | 12/2002 | Kim | H04L 12/66 710/305 |
| 2003/0019674 | A1 * | 1/2003 | Duan | 180/65.3 |
| 2004/0046394 | A1 * | 3/2004 | Lim | B60K 6/485 290/40 C |
| 2004/0163860 | A1 * | 8/2004 | Matsuzaki et al. | 180/65.2 |
| 2006/0080022 | A1 * | 4/2006 | Hrovat | B60K 28/16 701/82 |
| 2006/0289216 | A1 * | 12/2006 | Kato | 180/169 |
| 2008/0190675 | A1 * | 8/2008 | Itoh et al. | 180/65.2 |
| 2009/0115246 | A1 * | 5/2009 | Yanagida et al. | 303/144 |
| 2010/0025131 | A1 * | 2/2010 | Gloceri et al. | 180/65.28 |
| 2010/0038158 | A1 * | 2/2010 | Whitney et al. | 180/65.265 |
| 2010/0201293 | A1 * | 8/2010 | Yoshida et al. | 318/139 |
| 2010/0324762 | A1 * | 12/2010 | Imaseki et al. | 701/22 |
| 2011/0040432 | A1 * | 2/2011 | Kaltenbach et al. | 701/22 |
| 2011/0070991 | A1 * | 3/2011 | Wu et al. | 475/5 |
| 2011/0106350 | A1 * | 5/2011 | Jalbout et al. | 701/22 |
| 2011/0114396 | A1 * | 5/2011 | Schramm et al. | 180/54.1 |
| 2012/0095657 | A1 * | 4/2012 | Pudvay | F16H 59/12 701/53 |
| 2012/0191282 | A1 * | 7/2012 | Maki | 701/22 |
| 2012/0203406 | A1 * | 8/2012 | Akebono | B60W 10/02 701/22 |
| 2012/0226433 | A1 * | 9/2012 | Hasan | F02N 11/0837 701/112 |
| 2012/0277943 | A1 * | 11/2012 | Kim | 701/22 |
| 2012/0290179 | A1 * | 11/2012 | Oishi et al. | 701/54 |
| 2013/0080023 | A1 * | 3/2013 | Livshiz et al. | 701/102 |
| 2013/0138282 | A1 * | 5/2013 | Shin et al. | 701/22 |
| 2013/0173100 | A1 * | 7/2013 | Takagi | 701/22 |
| 2013/0184907 | A1 * | 7/2013 | Whitney et al. | 701/22 |
| 2013/0231816 | A1 * | 9/2013 | Hirata et al. | 701/22 |
| 2013/0274969 | A1 * | 10/2013 | Wang et al. | 701/22 |
| 2013/0297107 | A1 * | 11/2013 | Dai et al. | 701/22 |
| 2014/0073478 | A1 * | 3/2014 | Hashemi et al. | 477/5 |

OTHER PUBLICATIONS

Machine Translation of Sakata JP 2012-116412—translated Oct. 1, 2015.*

Machine Translation Yamada JP 2008-068704—translated Oct. 1, 2015.*

* cited by examiner

METHOD AND SYSTEM FOR OPERATING A HYBRID POWERTRAIN

FIELD

The present description relates to a system and methods for improving hybrid vehicle performance during conditions where a driving surface has a low friction coefficient. The method and system may be particularly useful for engines that are selectively coupled to an electrical machine and a transmission.

BACKGROUND AND SUMMARY

A driveline of a hybrid vehicle may include and engine and a motor. The motor and the engine may be selectively mechanically coupled to increase driveline output or to operate the motor and/or the engine more efficiently. The motor may provide torque to propel the vehicle or it may convert driveline rotational energy into electric energy. The engine may provide torque to propel the vehicle or it may provide torque to convert into electrical energy. However, it may be challenging to control driveline torque in a vehicle where multiple torque sources are providing torque to the vehicle driveline during varying driving conditions.

The inventors herein have recognized the above-mentioned issues and have developed a method for operating a hybrid powertrain, comprising: operating an engine and a motor to supply torque to a driveline; and supplying a transmission input shaft torque solely via the motor in response to a driving surface coefficient of friction is less than a threshold value.

By solely supplying torque from a motor to a transmission input shaft during slick road conditions, it may be possible to better control wheel slip. For example, a motor can supply torque to the transmission at a very low speeds so that wheel spin may be reduced. Additionally, torque delivery at lower transmission input shaft speeds may be smoother with the motor than the engine further reducing the possibility of wheel slip. In one example, the driving surface coefficient of friction may be estimated and the motor may be operated as the sole torque input source to the transmission based on the estimated coefficient of friction.

The present description may provide several advantages. Specifically, the approach may improve vehicle traction on driving surfaces that have a low coefficient of friction. Additionally, the approach may reduce driveline wear by reducing a number of engagements of a disconnect clutch.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
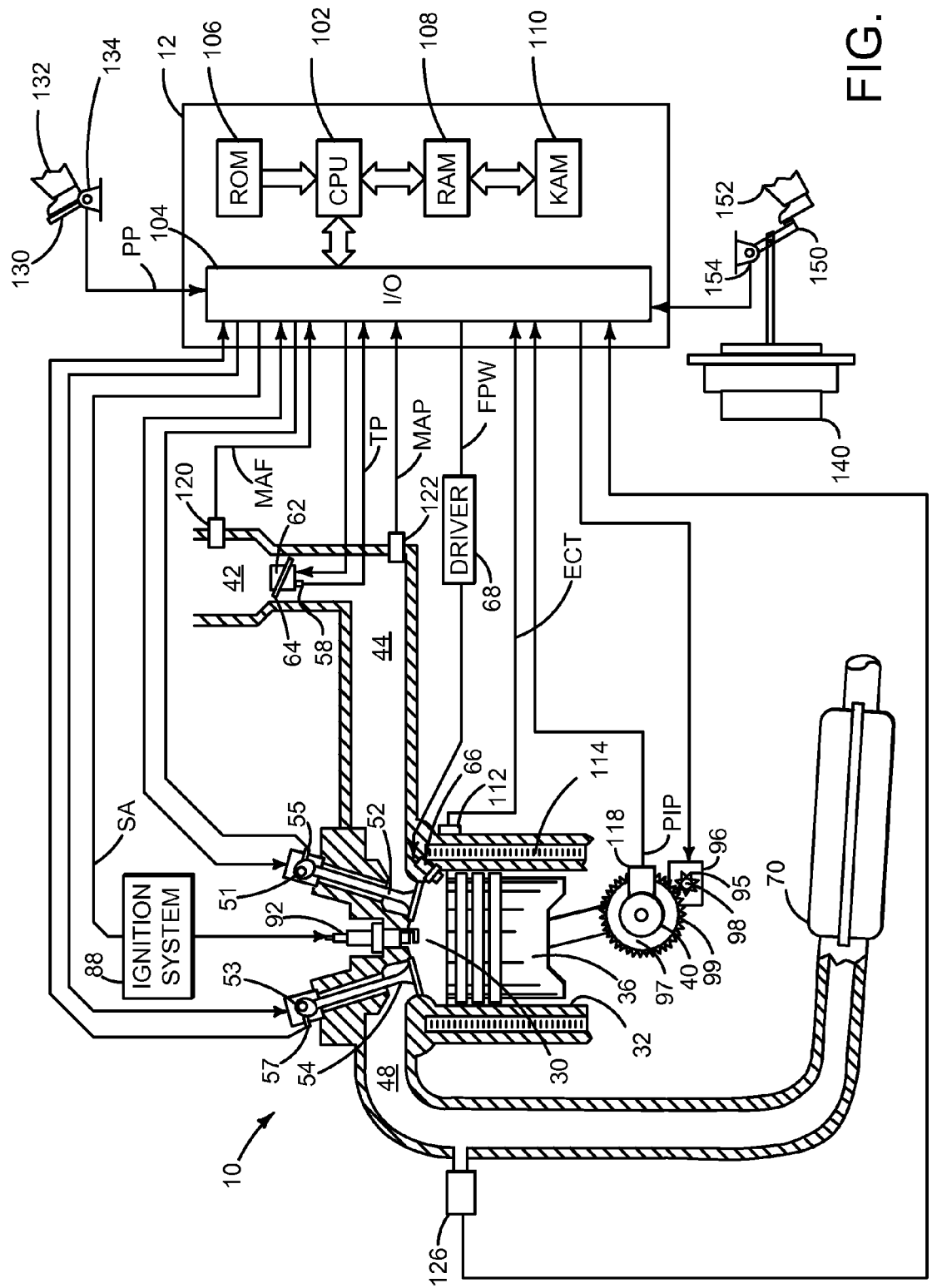
FIG. 1 is a schematic diagram of an engine.
Figure 2:
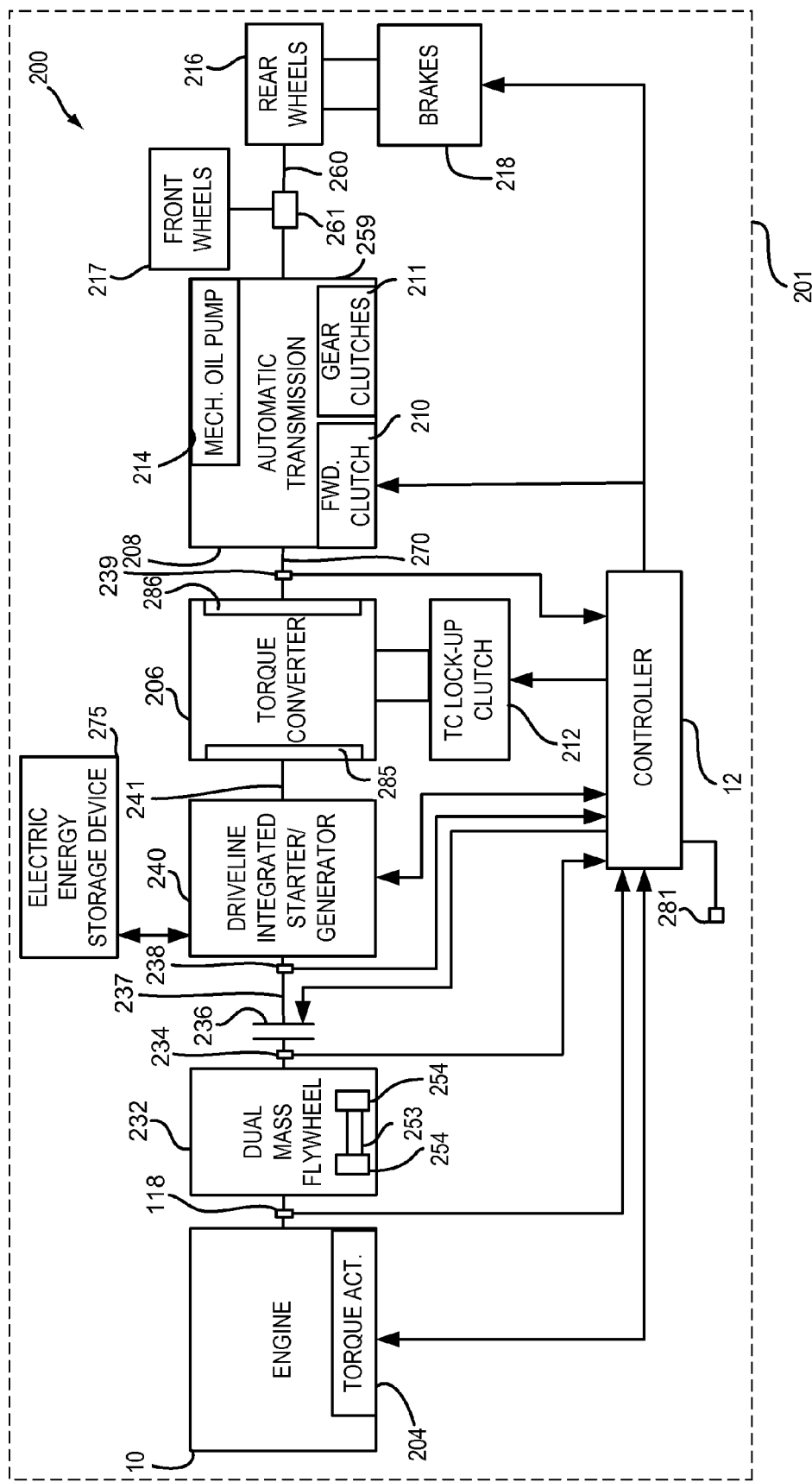
FIG. 2 is shows an example vehicle and vehicle driveline configuration.
Figure 3:
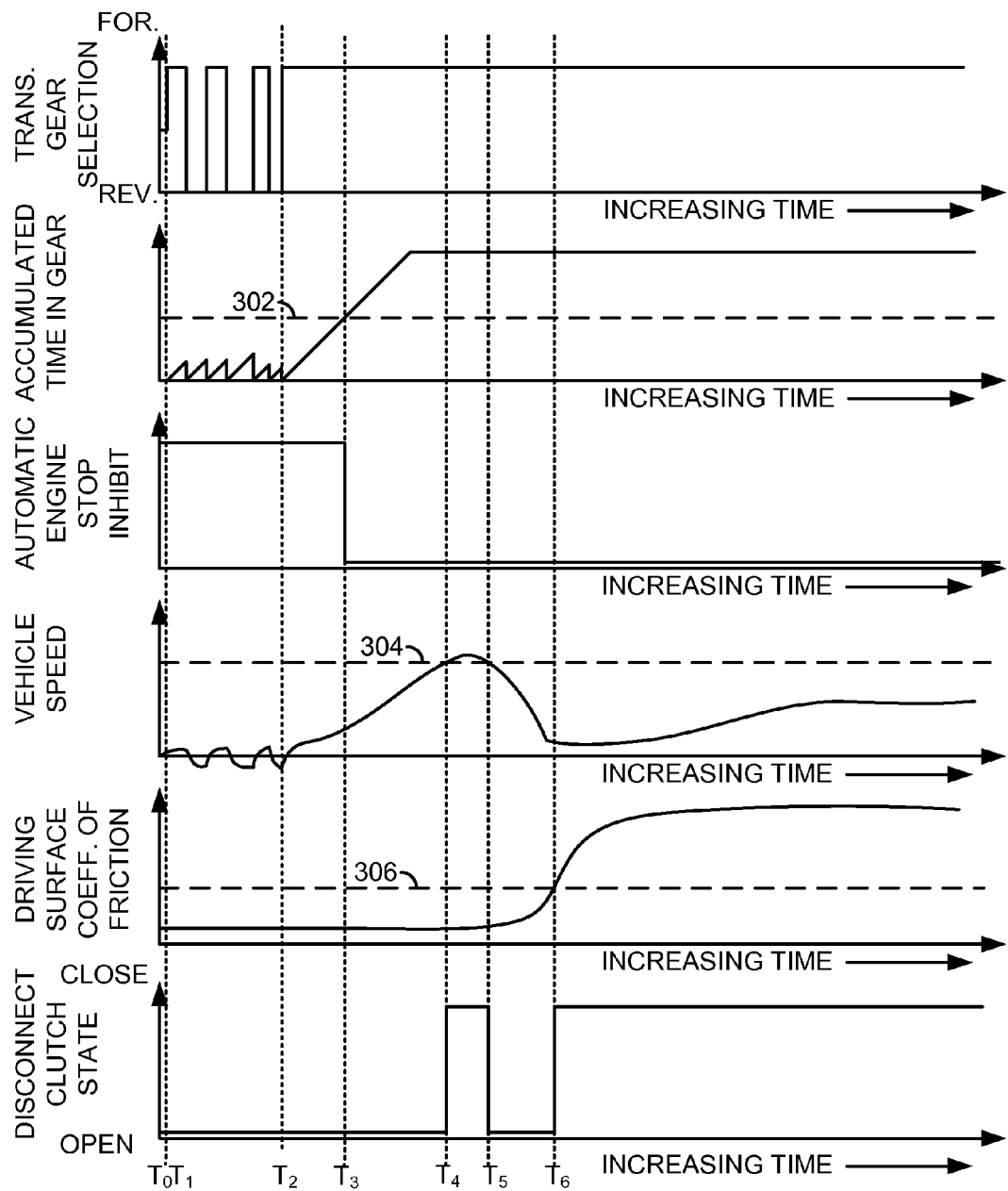
FIG. 3 is shows a first prophetic hybrid powertrain operating sequence.
Figure 4:
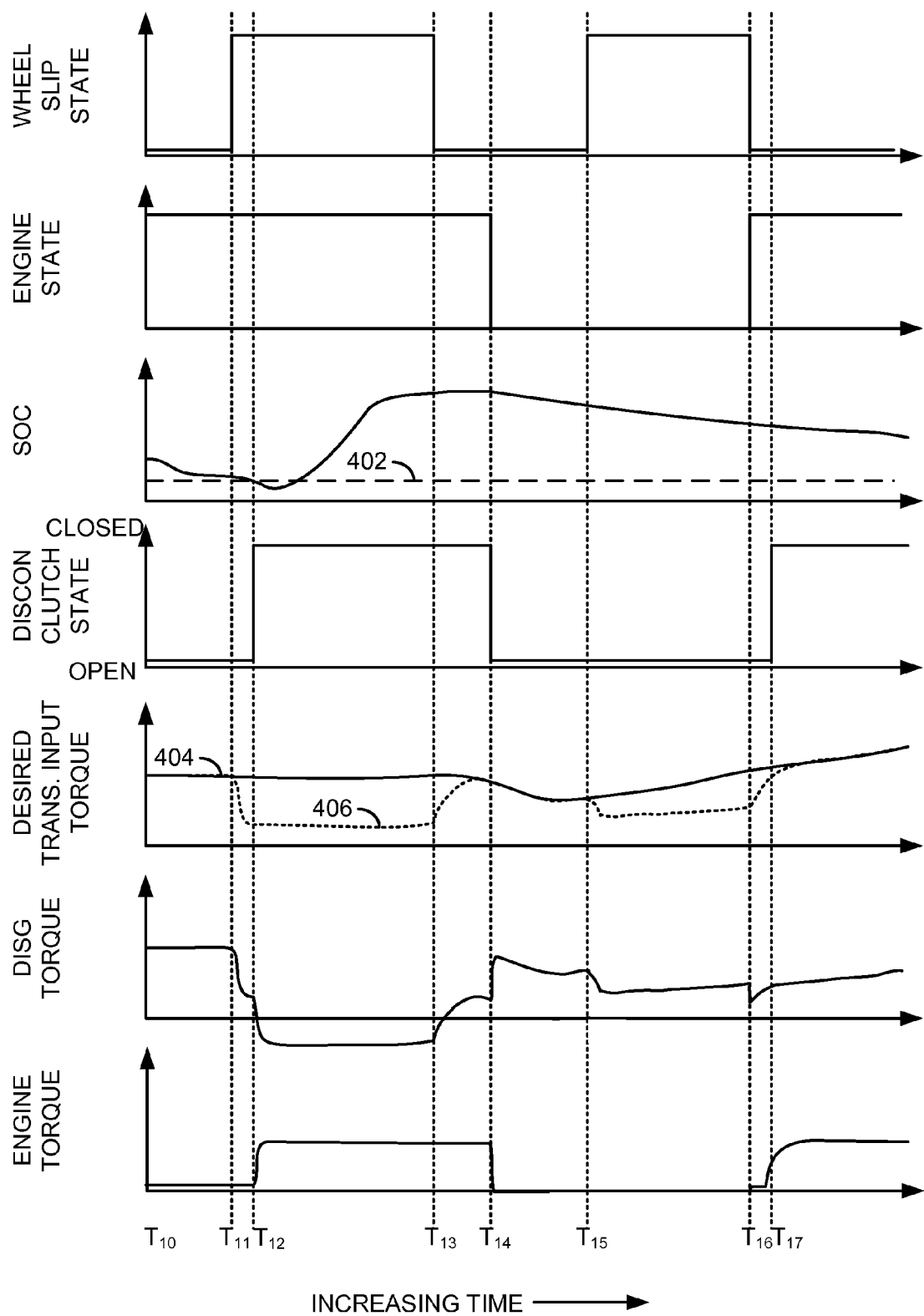
FIG. 4 is shows a second prophetic hybrid powertrain operating sequence.

The present description is related to controlling a hybrid vehicle powertrain. The hybrid vehicle may include an engine and electric machine as shown in FIGS. 1-2. The engine may be operated with or without a driveline integrated starter/generator (DISG) during vehicle operation. The driveline integrated starter/generator is integrated into the driveline on the same axis as the engine crankshaft and rotates whenever the torque converter impeller rotates. Further, the DISG may not be selectively engaged or disengaged from the driveline. Rather, the DISG is an integral part of the driveline. Further still, the DISG may be operated with or without operating the engine. The mass and inertia of the DISG remain with the driveline when the DISG is not operating to provide or absorb torque from the driveline. The hybrid vehicle may estimate road surface conditions to judge whether or not a vehicle may be automatically stopped as shown in FIG. 3 according to the method of FIGS. 5 and 6. Further, the hybrid vehicle may judge which power source provides wheel torque during different road surface conditions as shown in FIG. 4 according to the method of FIGS. 5 and 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Vehicle wheel brakes or regenerative braking via a DISG may be provided when brake pedal 150 is applied via foot 152. Brake pedal sensor 154 supplies a signal indicative of brake pedal position to controller 12. Foot 152 is assisted by brake booster 140 applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 201 and vehicle driveline 200. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, etc.

An engine output torque may be transmitted to an input side of dual mass flywheel (DMF) 232. Engine speed as well as dual mass flywheel input side position and speed may be determined via engine position sensor 118. Dual mass flywheel 232 may include springs 253 and separate masses 254 for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output power capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via output shaft 260. Specifically, automatic transmission 208 may transfer an input driving torque at the input shaft 270 responsive to a vehicle traveling condition before transmitting an output driving torque to the rear wheels 216. Torque may also be directed to front wheels 217 via transfer case 261.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 also receives driving surface grade input information from inclinometer 281.

Controller 12 may estimate a driving surface coefficient of friction from vehicle speed, wheel speed, driving surface grade, vehicle mass, and wheel torque. The driving surface coefficient of friction may be estimated during conditions when wheel slip is present or when wheel slip is not present.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate the engine by resuming combustion in engine cylinders.

Thus, the system of FIGS. 1 and 2 provides for a system for operating a hybrid powertrain, comprising: an engine; a DISG; a disconnect clutch positioned in a driveline between the engine and the DISG; and a controller including executable instructions stored in non-transitory memory, the executable instructions adjusting a state of a disconnect clutch in response to vehicle wheel slip. The system further comprises additional executable instructions for adjusting an operating mode of an engine in response to vehicle wheel slip. The system further comprises additional executable instructions for adjusting a DISG to contemporaneously reduce wheel slip and charge an energy storage device. In one example, the system further comprises additional executable instructions for adjusting transmission input shaft torque to an amount that reduces wheel slip to less than a threshold amount. The system also includes instructions for operating the engine in a torque control mode. The system also includes instructions for operating the engine in a speed control mode.

Referring now to FIG. 3, an example vehicle operating sequence is shown. The sequence of FIG. 3 shows hybrid driveline response to vehicle rocking and operating on a surface with a varying coefficient of friction. The example sequence may be performed by the system of FIGS. 1 and 2 according to the method of FIGS. 5 and 6.

The first plot from the top of the figure shows transmission gear selection versus time. The Y axis represents the transmission gear selection state, and transmission gear states are forward and reverse. The transmission is in a forward gear when the transmission gear state trace is at a higher level. The transmission is in a reverse gear when the transmission gear state trace is at a lower level. The X axis represents time and time increases from the left to the right side of the plot.

The second plot from the top of the figure shows accumulated time in gear versus time. The Y axis represents accumulated time in a gear and the accumulated time in gear increases in the direction of the Y axis arrow. The accumulated time in gear increases when the transmission is in reverse or forward. The accumulated time in gear resets to zero when the transmission exits from reverse or forward. The X axis represents time and time increases from the left to the right side of the plot. Horizontal line 302 represents a threshold amount of time for the transmission to be in a reverse or forward gear before automatic engine stopping is permitted.

The third plot from the top of the figure shows an automatic engine stop inhibit state. The Y axis represents an automatic engine stop inhibit state. The engine is permitted to be stopped automatically when the automatic engine stop inhibit state trace is at a lower level. The engine is not permitted to be automatically stopped when the automatic engine stop inhibit state trace is at a higher level. The X axis represents time and time increases from the left to the right side of the plot.

The fourth plot from the top of the figure represents vehicle speed versus time. The Y axis represents vehicle speed and vehicle speed increases in the direction of the Y axis arrow. The X axis represents time and time increases from the left to the right side of the plot. The vehicle direction is in reverse when the vehicle speed is less than the level of the X axis. Horizontal line 304 represents a threshold vehicle speed where the disconnect clutch state may be changed, if desired, irrespective of the driving surface coefficient of friction.

The fifth plot from the top of the figure shows driving surface coefficient of friction versus time. The Y axis represents driving surface coefficient of friction and driving surface coefficient of friction increases in the direction of the Y axis arrow. The X axis represents time and time increases from the left to the right side of the plot. Horizontal line 306 represents a threshold driving surface coefficient of friction where vehicle wheel torque may be provided by other than solely via the DISG. For example, wheel torque may be provided via the engine or the engine and the DISG when the driving surface coefficient of friction is greater than the level of threshold 306. Wheel torque may be provided solely via the DISG when the driving surface coefficient of friction is less than the level of threshold 306.

The sixth plot from the top of the figure shows the disconnect clutch state versus time. The Y axis represents disconnect clutch state. The disconnect clutch is open when the disconnect clutch state trace is at a higher level. The disconnect clutch is closed when the disconnect clutch state trace is at a lower level. The X axis represents time and time increases from the left to the right side of the plot.

At time $T_0$, the vehicle is stopped and the transmission is in neutral and is therefore neither in a forward nor a reverse gear. An engine of the vehicle has started and is running, but its operating state is not shown. The accumulated time in gear is zero and the engine automatic stop inhibit is asserted so that the engine may not be automatically stopped without direct input from a driver to stop the engine. An automatic stop may be initiated by a controller when selected operating conditions are present. An automatic engine stop is not initiated by a driver operating an input that has a sole function or purpose of starting and/or stopping the engine (e.g., an ignition key switch). The disconnect clutch is shown in an open state and the driving surface coefficient of friction is estimated to be at a lower level.

At time $T_1$, the transmission is engaged to a forward gear by a driver (not shown). The vehicle speed changes a small amount and the accumulated time in gear begins to increase. The automatic engine stop inhibit state remains at a high level and the driving surface coefficient of friction remains at a lower level. The disconnect clutch state remains in an open state.

Between time $T_1$ and time $T_2$, the driver shifts the transmission from a forward gear to a reverse gear repeatedly. In one example, the driver is attempting to rock the vehicle from a position where the vehicle wheels spin and reduce forward vehicle motion (e.g., where the vehicle is stuck). Each time the driver shifts from a forward gear to a reverse gear or vice-versa, the accumulated time in gear is reset to zero. Thus, the accumulated time in gear remains well below threshold 302 and consequently automatic engine stopping is not permitted. The vehicle speed changes between forward and reverse directions and the driving surface coefficient remains at a lower value. The disconnect clutch state also remains open.

At time $T_2$, the driver stops switching between a forward transmission gear and a reverse transmission gear. The accumulated time in gear increases steadily toward threshold 302. The vehicle speed slowly increases and the driving surface coefficient of friction remains at a lower value.

At time $T_3$, the accumulated time in gear reaches the threshold amount of time 302 where automatic engine stopping is permitted. The engine may be permitted to be automatically stopped when selected operating conditions are present (e.g., vehicle speed is zero and when the brake pedal is applied). Automatic engine stopping is permitted when the automatic engine stop inhibit trace transitions to a lower level. Vehicle speed also continues to increase and the driving surface coefficient of friction remains at a lower level. The disconnect clutch remains in an open state and the transmission remains in a forward gear.

At time $T_4$, the vehicle speed reaches the level of horizontal line 304 in response to a driver torque demand where the disconnect clutch may be engaged. In this example, the disconnect clutch is held in an open state prior to time $T_4$ in response to the driving surface coefficient being less than a threshold amount and vehicle speed being less than a threshold amount. In this way, when a driving surface coefficient of friction is less than a threshold amount, wheel torque may be solely provided via the DISG. The automatic engine stop inhibit state trace remains at a lower level indicating that automatic engine stopping is permitted. The transmission also remains in a forward gear.

At time $T_5$, the vehicle speed is reduced to below the level of horizontal line 304 in response to a decreasing driver torque demand (not shown). The disconnect clutch state trace transitions from a closed state (e.g., higher level) to an open state (e.g., lower level) in response to vehicle speed being less than the threshold vehicle speed 304 where the disconnect clutch state may be changed if desired irrespective of the driving surface coefficient of friction. Thus, when vehicle speed is less than threshold 304 and the driving surface coefficient is less than threshold 306, wheel torque may be provided solely via the DISG.

At time $T_6$, the driving surface coefficient of friction increases in response to the vehicle passing over a driving surface having a different coefficient of friction. The disconnect clutch closes in response to the driving surface coefficient increasing to a level greater than threshold level 306. Thus, when the driving surface coefficient of friction increases above threshold level 306, wheel torque may be provided other than solely via the DISG. Additionally, the vehicle speed is at a lower level and automatic engine stopping is permitted. The accumulated time in gear remains at a higher level, and as a result, automatic engine stop inhibiting state remains at a lower level so that automatic engine stopping is permitted. The sequence continues after time $T_6$ and the disconnect clutch remains in a closed state.

Referring now to FIG. 4, a second example vehicle operating sequence is shown. The sequence of FIG. 4 shows hybrid driveline response to wheel slip. The example sequence may be performed by the system of FIGS. 1 and 2 according to the method of FIGS. 5 and 6.

The first plot from the top of the figure shows a wheel slip state versus time. The Y axis represents the wheel slip state. One or more vehicle wheels are slipping when the wheel slip state trace is at a higher level. No vehicle wheels are slipping when the wheel slip state trace is at a lower level. The X axis represents time and time increases from the left to the right side of the plot.

The second plot from the top of the figure shows engine state versus time. The Y axis represents engine state. The engine is operating and combusting air-fuel mixtures when the engine state is at a higher level. The engine is not operating and not combusting air-fuel mixtures when the engine state is at a lower level. The X axis represents time and time increases from the left to the right side of the plot.

The third plot from the top of the figure shows state of charge (SOC) for an energy storage device (e.g., a battery or capacitor). The Y axis represents SOC of the energy storage device. The X axis represents time and time increases from the left to the right side of the plot. Horizontal line 402 represents a threshold SOC below which it is desirable to charge the energy storage device.

The fourth plot from the top of the figure represents the disconnect clutch state versus time. The Y axis represents disconnect clutch state. The disconnect clutch is open when the disconnect clutch state trace is at a lower level. The disconnect clutch is closed when the disconnect clutch state trace is at a higher level. The X axis represents time and time increases from the left to the right side of the plot.

The fifth plot from the top of the figure shows desired transmission input torque versus time. The Y axis represents desired transmission input torque and desired transmission torque increases in the direction of the Y axis arrow. The X axis represents time and time increases from the left to the right side of the plot. Solid line 404 represents desired transmission input torque and dashed line 406 represents actual delivered transmission input torque. The desired transmission input torque may be converted to a desired wheel torque by accounting for the transmission gears and axle ratio.

The sixth plot from the top of the figure shows DISG torque versus time. The Y axis represents DISG torque. The DISG is providing torque to the driveline when DISG torque trace is above the X axis. The DISG is absorbing torque from the driveline when the DISG torque trace is below the X axis. The X axis represents time and time increases from the left to the right side of the plot.

The seventh plot from the top of the figure shows engine torque versus time. The Y axis represents engine torque and engine torque increases in the direction of the Y axis arrow. The X axis represents time and time increases from the left to the right side of the plot.

At time $T_{10}$, the engine is running as indicated by the engine state being at a higher level. The engine is outputting torque at a level that operates the engine at idle speed. The disconnect clutch is in an open state and the desired transmission torque is at a middle level. The vehicle wheels are not slipping since the wheel slip state is at a lower level. The energy storage device SOC is at a lower level, but it is greater than threshold 402 so that the energy storage device does not have to be recharged. The desired transmission input torque is at a middle level and the DISG is supplying torque at the desired transmission input torque level.

At time $T_{11}$, the vehicle wheel begins to slip and the wheel slip state trace transitions from a lower level to a higher level to indicate wheel slip. The driver holds the desired transmission input torque 404 at a constant level. The engine continues to run and the energy storage device SOC declines as the DISG provides torque to the vehicle wheels via the transmission. The DISG output torque is reduced in response to the wheel slip and the DISG adjusts the actual transmission input torque 406 to a level that reduces the amount of wheel slip to less than a threshold amount. In one example, the amount of wheel slip is determined via comparing speed of a driven wheel to speed of a non-driven wheel. The amount of slip is the difference in speed between the driven wheel and the non-driven wheel. The DISG provides torque to the transmission input shaft at a level that reduces the amount of wheel slip to an amount below a threshold amount (e.g., 10 RPM). The engine torque remains at a lower level which maintains the engine at idle speed.

At time $T_{12}$, the energy storage device SOC decreases to a level less than the threshold level indicated at 402 and the disconnect clutch is closed in response to the low SOC. The engine remains running and the engine torque output is increased to a higher level constant torque output. Further, the DISG changes from a motor mode to a generator/alternator mode. After changing modes, the DISG begins to charge the energy storage device. Wheel slip continues and the DISG adjusts the actual torque input to the transmission 406 via the engine to a level that reduces wheel slip to less than a threshold amount. The DISG converts the remaining torque to electrical energy and charges the energy storage device.

At time $T_{13}$, the engine continues to operate in a torque control mode and the wheel slip state trace transitions to a lower level indicating that wheel slip is no longer present. The SOC continues to increase as the DISG charges the energy storage device. The actual transmission input torque 406 is increased in response to the lack of wheel slip so that the actual transmission input torque matches the desired transmission input torque. The transmission input torque 406 increases as the DISG switches from generator/alternator mode to motor mode. The engine continues to operate in a torque control mode.

Between time $T_{13}$ and time $T_{14}$, the actual transmission torque increases to a level of the desired transmission torque. The engine torque remains at a constant level and the engine remains in a torque control mode. The actual transmission input torque is increased by increasing DISG torque output. The disconnect clutch remains in a closed state.

At time $T_{14}$, the disconnect clutch is opened as indicated by the disconnect clutch state transitioning to a lower level. The engine is also stopped as indicated by the engine state transitioning from a higher level to a lower level. The engine state and disconnect clutch state are changed in response to operating conditions (e.g., the SOC being at a threshold level and the transmission input torque level being at a lower level). The DISG torque increases as the engine torque is decreased, and the DISG provides torque to the transmission at the desired transmission input torque level.

At time $T_{15}$, the wheel slip state transitions to a higher level in response to the presence of wheel slip. The engine remains stopped and the actual transmission input torque is reduced to a level where the amount of wheel slip is less than a threshold amount. Since the engine is stopped, the actual transmission input torque is adjusted via adjusting the DISG output torque. In particular, the DISG output torque is reduced in response to wheel slip. The disconnect clutch remains in an open state since the SOC is at a higher level.

At time $T_{16}$, the wheel slip state transitions to a lower level to indicate the absence of wheel slip in response to substantially no difference between vehicle speed and wheel speed (e.g., ±2 MPH). The actual transmission torque is increased so as to provide the desired transmission input torque. The engine is started a short time later in response to the increasing actual transmission input torque. The energy storage device SOC continues to decrease as the DISG continues to supply energy to propel the vehicle.

At time $T_{17}$, the disconnect clutch closes. The engine torque output is also increased along with the DISG output torque so that the actual transmission input torque matches the desired transmission input torque.

In this way, the disconnect clutch, DISG, and engine may be adjusted in response to an indication of wheel slip. Further, the DISG may limit transmission input torque during wheel slip via charging an energy storage device according to an amount of engine torque that provides transmission input torque in excess of an amount of transmission input torque which produces more than a threshold amount of wheel slip.

Figure 5:
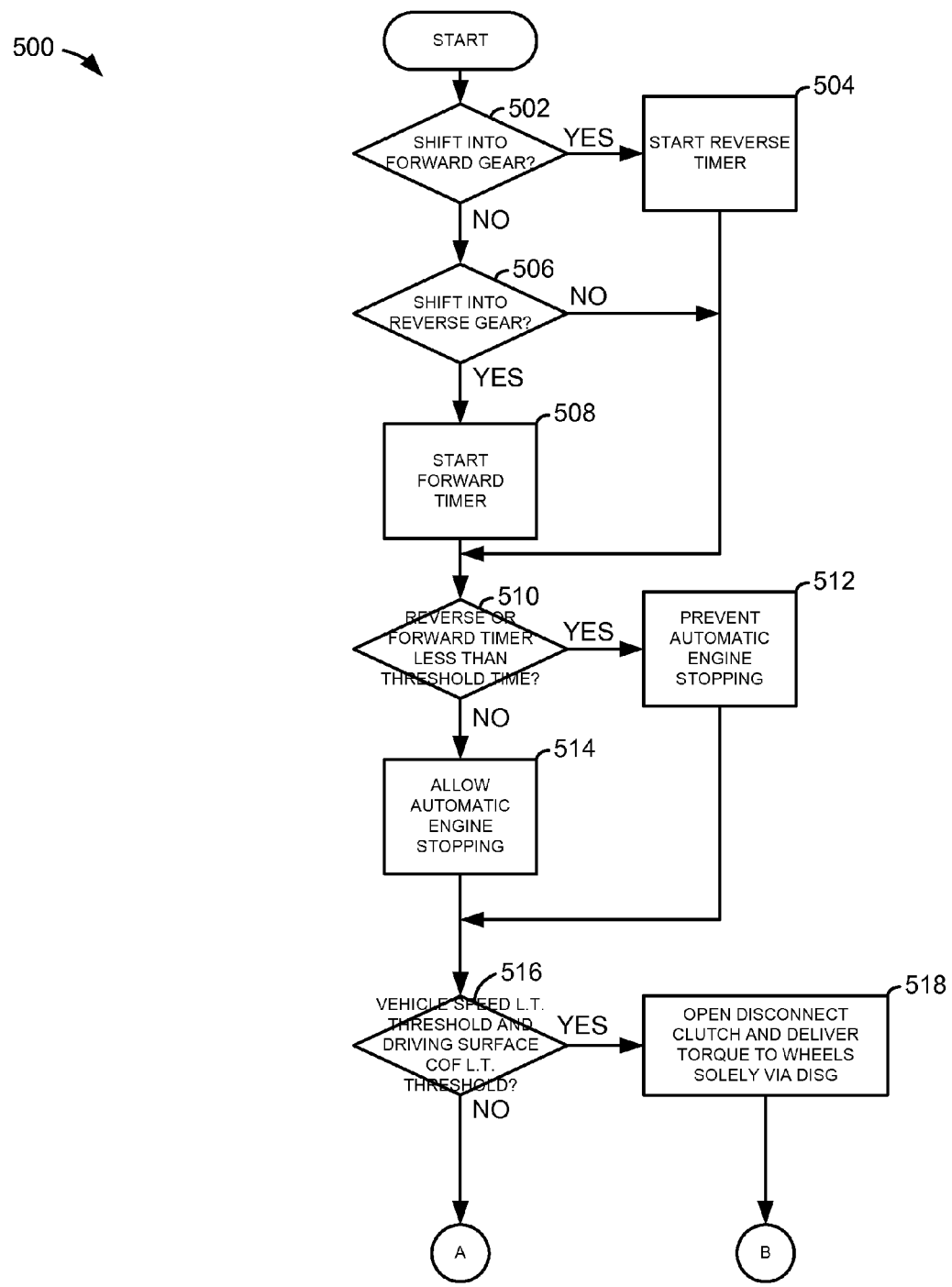
FIGS. 5 and 6 show an example method for operating a hybrid powertrain.
Figure 6:
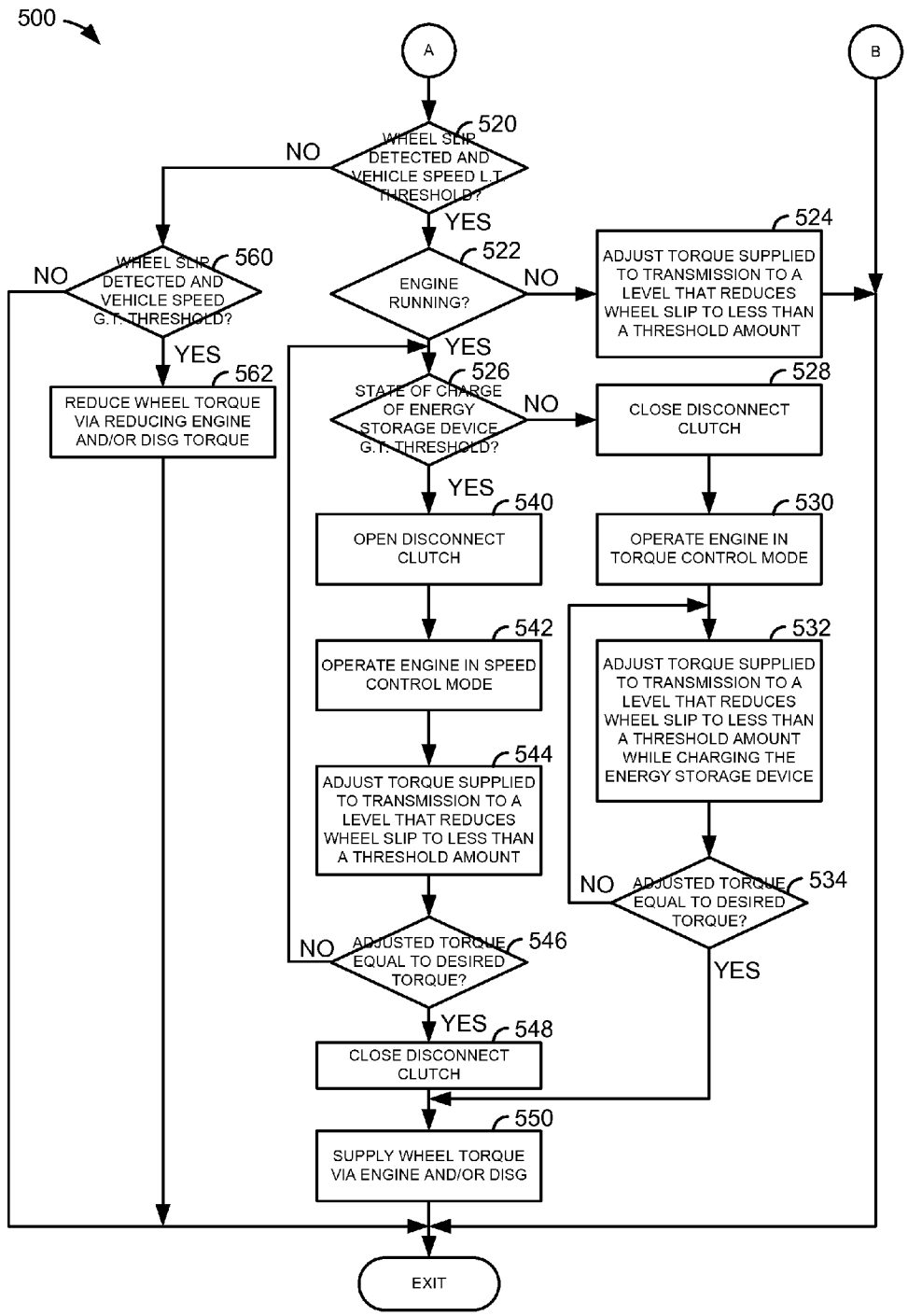

Referring now to FIGS. 5 and 6, an example method for operating a hybrid vehicle powertrain is shown. The method of FIGS. 5 and 6 may be stored as executable instructions in non-transitory memory in the system of FIGS. 1 and 2. Further, the method of FIGS. 5 and 6 may provide the sequences shown in FIGS. 3 and 4.

At 502, method judges whether or not a transmission is shifted into a forward gear or is already in a forward gear. Method 500 may judge that a shift has occurred in response to a shift sensor output. If method 500 judges that a transmission has been shifted from reverse to forward or is already in a forward gear, method 500 proceeds to 504. Otherwise, method 500 proceeds to 506.

At 504, method 500 starts a forward gear timer and accumulates the amount of time the transmission is in a forward gear or continues to increment the forward gear timer if the transmission was already in a forward gear. A reverse gear timer may also be reset to zero when the forward timer begins to increase. In other examples, a single timer that handles forward and reverse gears may count time when the transmission is in either a forward or reverse gear. The single timer is reset to zero and begins counting from zero each time the transmission is shifted from reverse to forward or vice-versa. Method 500 proceeds to 510.

At 506, method 500 judges whether or not the transmission has been shifted from a forward gear to a reverse gear or is already in a reverse gear time. If method 500 judges that the transmission has been shifted into a reverse gear or is already in a reverse gear, method 500 proceeds to 508. Otherwise, method 500 proceeds to 510.

At 508, method 500 starts a reverse gear timer and accumulates the amount of time the transmission is in a reverse gear or continues to increment the reverse gear timer if the transmission was already in a reverse gear. A forward gear timer may also be reset to zero when the reverse gear timer begins to increase. In other examples where a single timer that handles forward and reverse gears, the single timer is reset to zero and begins counting from zero. Method 500 proceeds to 510.

At 510, method 500 judges whether or not the forward timer, when the transmission is in a forward gear, or reverse timer, when the transmission is in a reverse gear, has counted to a number that is greater than a threshold time. Alternatively, where a single timer is used, method 500 judges whether or not a value of the single timer is greater than the threshold time. If so, method 500 proceeds to 512. Otherwise, method 500 proceeds to 514.

In this way, method 500 may detect whether or not a driver is rocking a vehicle back and forth via shifting from a forward gear to a reverse gear and vice-versa for the purpose of freeing a stuck vehicle. Automatic engine stopping is prohibited and/or inhibited (e.g., stopped) when vehicle rocking is detected so that the engine is not stopped when the driver wishes to free the vehicle.

At 512, method 500 prevents automatic engine stopping. Automatic engine stopping may be described as stopping the engine without a driver providing input to a device that has a sole purpose or function of starting/stopping the engine (e.g., an ignition switch). In some examples, a controller may automatically stop the engine to conserve fuel when vehicle speed is zero and when the vehicle's brakes are applied. Thus, when automatic engine stopping is prevented, the controller allows the engine to run when the vehicle is stopped and when the brakes are applied. Method 500 proceeds to 516 after automatic engine stopping has been prevented.

Additionally, in some examples, a present state of a disconnect clutch may be held when a forward or reverse gear timer is less than a threshold value. By holding the disconnect clutch state, it may be possible to reduce disconnect clutch wear.

At 514, method 500 allows automatic engine stopping. In one example, a controller may automatically stop an engine to conserve fuel in response to vehicle operating conditions (e.g., a stopped vehicle with vehicle brakes being applied). Automatic engine stopping may be allowed via asserting a variable in memory that indicates whether or not automatic engine stopping is allowed. Method 500 proceeds to 516 after automatic engine stopping is allowed.

Additionally, in some examples, a present state of a disconnect clutch may be allowed to change when a forward or reverse gear timer is greater than a threshold value. By allowing the disconnect clutch state to change state, it may be possible to conserve additional fuel.

At 516, method 500 judges whether or not vehicle speed is less than a threshold vehicle speed and if a surface the vehicle is on has a coefficient of friction less than a threshold coefficient of friction. The driving surface coefficient of friction may be determined via known methods. In one example, the driving surface coefficient of friction is estimated using an amount of wheel slip and transmission input torque. If method 500 judges that vehicle speed is less than a threshold speed and if the driving surface has a coefficient of friction that is less than a threshold coefficient of friction, method 500 proceeds to 518. Otherwise, method 500 proceeds to 520.

At 518, method 500 opens the disconnect clutch and delivers torque to the transmission input shaft solely via the DISG. The DISG may operate at lower speeds and torques than the engine; therefore, it may be possible to increase vehicle speed via supplying a lower amount of torque to vehicle wheels solely via the DISG. Method 500 proceeds to exit after the disconnect clutch is opened. Alternatively, in some examples, method 500 proceeds to 520.

At 520, method 500 judges whether or not wheel slip has been detected and vehicle speed is less than a threshold vehicle speed. Wheel slip may be judged when wheel speed of a driven wheel exceeds the speed of a non-driven wheel by more than a predetermined threshold speed. If method 500 judges that wheel slip is present and vehicle speed is less than a threshold vehicle speed, method 500 proceeds to 522. Otherwise, method 500 proceeds to 560.

At 522, method 500 judges whether or not the engine is running and combusting air-fuel mixtures. If method 500 judges that the engine is running, method 500 proceeds to 526. Otherwise, method 500 proceeds to 524.

At 524, method 500 adjusts an amount of torque supplied to a transmission input shaft to a level that is less than the desired transmission input torque and to a level that reduces wheel slip to less than a threshold amount. The amount of torque supplied to the transmission input shaft may be adjusted by adjusting DISG speed and torque. In one example, DISG speed and torque output account for torque multiplication via a torque converter at the transmission input shaft when delivering a desired amount of transmission input shaft torque. For example, if a desired transmission input torque is 50 N-m and the torque converter torque multiplication is 1.1 at the present torque converter input speed, the DISG output torque is adjusted to 45.5 N-m. Further, DISG output torque is reduced from a level that provides the desired transmission input shaft torque in response to wheel slip. In particular, the DISG output torque is reduced until the amount of wheel slip is less than a threshold amount of wheel slip. Thus, DISG output torque is adjusted in response to wheel slip. Method 500 exits after the DISG torque is adjusted.

At 526, method 500 judges whether or not SOC of an energy storage device is greater than a threshold amount. In one example, the threshold amount is a minimum battery charge level. If method 500 judges that SOC of the energy conversion device is greater than a threshold, method 500 proceeds to 540. Otherwise, method 500 proceeds to 528.

At 528, method 500 closes the disconnect clutch in response to the energy storage device SOC. The disconnect clutch is closed so that mechanical energy may be transferred from the engine to the DISG. Method 500 proceeds to 530 after the disconnect clutch is closed.

At 530, method 500 operates the engine in a torque control mode. In one example, the engine torque output is adjusted to a constant torque level that provides the desired transmission input torque while the energy storage device is charged. Thus, the engine torque output is adjusted to a constant torque that is greater than a level of torque that provides the desired transmission input torque. Engine torque may be adjusted to a constant level via adjusting throttle position, cam timing, spark timing, valve timing, and/or fuel injection amount. Method 500 proceeds to 532 after the engine is operated in a torque control mode.

At 532, method 500 adjusts torque supplied to the transmission input shaft to a level that reduces wheel slip to less than a threshold amount while the energy storage device is being charged. In particular, the DISG converts a portion of engine torque into electrical energy so that the torque provided to the transmission input is reduced. In one example, the amount of engine torque converted to electrical energy is increased proportionate to an amount of wheel slip. If wheel slip increases, the amount of engine output torque converted to electrical energy is increased so as to lower the amount of torque input to the transmission via the engine and DISG. Consequently, actual transmission input torque may be reduced to an amount less than a desired transmission input torque. The amount of engine torque converted to electrical energy via the DISG is adjusted (e.g., increased or decreased) to provide less than a threshold amount of wheel slip. If wheel slip is reduced to near zero, the transmission input torque may be increased until the actual transmission input torque matches the desired transmission input torque. In this way, the amount of wheel slip may be reduced while the energy conversion device is being charged. Additionally, actual wheel torque may be adjusted instead of or in addition to transmission input torque to provide wheel slip less than a threshold level of wheel slip. Method 500 proceeds to 534 after torque applied to the transmission and/or wheels is adjusted to a level that provides less than a threshold amount of wheel slip.

At 534, method 500 judges whether or not adjusted or actual transmission input torque or wheel torque is at or substantially equal (e.g., ±5 N-m) to a desired transmission input torque or desired wheel torque. The adjusted transmission input torque converges to the desired transmission input torque when wheel slip is reduced to near zero. If method 500 judges that actual transmission input torque is at the desired transmission input torque, method 500 proceeds to 550. Otherwise, method 500 returns to 532 where wheel slip is controlled via adjusting an amount of engine torque that in converted to electrical energy via the DISG.

At 540, method 500 opens the disconnect clutch in response to the energy storage device SOC. The disconnect clutch is mechanically opened so that the DISG may provide input torque to the transmission without influence from the engine. Method 500 proceeds to 542 after the disconnect clutch is opened.

At 542, the engine is operated in a speed control mode. In one example, engine torque is adjusted to maintain the engine at a desired speed (e.g., idle speed). Method 500 proceeds to 544 after the engine is operated in a constant speed mode.

At 544, method 500 adjusts torque supplied to the transmission input shaft to a level that reduces wheel slip to less than a threshold amount. The transmission input shaft torque is supplied solely via the DISG. Consequently, DISG speed and/or torque may be adjusted to supply torque to the transmission input shaft at a level that reduces wheel slip to less than a threshold amount of wheel slip. In one example, the DISG reduces transmission input torque proportionate to an amount of wheel slip. If wheel slip increases, DISG output torque is decreased. Consequently, actual transmission input torque may be reduced to an amount less than a desired transmission input torque. If wheel slip is reduced to near zero, the transmission input torque can be increased via increasing DISG output torque until the actual transmission input torque matches the desired transmission input torque. In this way, the amount of wheel slip may be reduced. Additionally, actual wheel torque may be adjusted instead of or in addition to transmission input torque to provide wheel slip less than a threshold level of wheel slip. Method 500 proceeds to 546 after torque applied to the transmission and/or wheels is adjusted to a level that provides less than a threshold amount of wheel slip.

At 546, method 500 judges whether or not adjusted or actual transmission input torque or wheel torque is at or substantially equal (e.g., ±5 N-m) to a desired transmission input torque or desired wheel torque. The adjusted transmission input torque converges to the desired transmission input torque when wheel slip is reduced to near zero. If method 500 judges that actual transmission input torque is at the desired transmission input torque, method 500 proceeds to 548. Otherwise, method 500 returns to 526.

At 548, method 500 closes the disconnect clutch. The disconnect clutch is closed so that the energy conversion device may be recharged. However, in some examples, the disconnect clutch may remain open until the energy storage device SOC is less than a threshold amount. Method 500 proceeds to 550.

At 550, method 500 supplies transmission input shaft torque and wheel torque via the engine and/or DISG. The transmission input shaft torque and/or wheel torque may be based on a driver requested torque, energy conversion device SOC, vehicle speed, and other vehicle operating conditions. Actual transmission input shaft torque and actual wheel torque are adjusted to approach desired transmission input shaft torque and desired wheel torque except during select conditions such as wheel slip. Method 500 proceeds to exit after transmission input shaft torque and/or wheel torque are adjusted.

At 560, method 500 judges whether or not wheel slip is detected and if vehicle speed is greater than a threshold vehicle speed. If so, method 500 proceeds to 562. Otherwise, method 500 proceeds to exit.

At 562, method 500 reduces transmission input shaft torque and/or wheel torque via reducing DISG and/or engine torque. Engine torque may be reduced via closing a throttle, adjusting valve timing, and/or retarding spark timing. DISG torque may be reduce via reducing an amount of current supplied to the DISG. Thus, at higher vehicle speeds, transmission input torque and wheel torque can be reduced without opening the disconnect clutch and/or regulating transmission input torque via the DISG. Method 500 proceeds to exit after the engine and/or DISG torque is adjusted.

The method of FIGS. 5 and 6 provides for operating a hybrid powertrain, comprising: operating an engine and a motor to supply torque to a driveline; and supplying a transmission input shaft torque solely via the motor when a driving surface coefficient of friction is less than a threshold value. The method further comprises adjusting torque supplied to the transmission input shaft to a level that reduces wheel slip to less than a threshold amount. The method further comprises opening a disconnect clutch in response to wheel slip.

In one example, the method further comprises operating the engine in a constant speed mode after opening the disconnect clutch. The method further comprises supplying transmission input shaft torque via a DISG and the engine when vehicle speed is greater than a threshold speed, and reducing the transmission input shaft torque in response to wheel slip via reducing engine torque. The method further comprises reducing the transmission input shaft torque in response to wheel slip via reducing current supplied to the DISG.

The method of FIGS. 5 and 6 also includes operating a hybrid powertrain, comprising: operating an engine and a motor to supply torque to a driveline; and inhibiting automatic engine stopping in response to vehicle rocking. The method includes where vehicle rocking is determined based on an amount of time in a gear. The method further comprises adjusting DISG output torque in response to an amount of wheel slip. The method also further comprises opening a disconnect clutch in response to a driving surface coefficient of friction being less than a threshold value. The method further comprises allowing automatic engine stopping in response to an absence of vehicle rocking.

In another example, the method further comprises adjusting an operating state of a disconnect clutch in response to a driving surface coefficient of friction. The method further comprises additionally adjusting the operating state of the disconnect clutch in response to vehicle speed. The method further comprises holding a disconnect clutch in its present state in response to vehicle rocking.

As will be appreciated by one of ordinary skill in the art, methods described in FIGS. 5-6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a hybrid powertrain, comprising:
   operating an engine and a motor to supply torque to a driveline, wherein the engine is selectively coupled to the motor via a driveline disconnect clutch;
   holding a driveline disconnect clutch in its present state in response to times in a forward gear and times in a reverse gear not exceeding a threshold during transmission shifting from the forward gear to the reverse gear and from the reverse gear to the forward gear repeatedly.

2. The method of claim 1, further comprising automatically stopping the engine in response to zero vehicle speed and an applied brake when an amount of time in the forward gear or reverse gear is greater than the threshold.

3. The method of claim 2, further comprising adjusting motor output torque of the motor in response to an amount of wheel slip, and where the motor is coupled to the engine via the disconnect clutch.

4. The method of claim 3, further comprising opening the disconnect clutch and supplying torque to a transmission input shaft via the motor in response to a driving surface coefficient of friction being less than a threshold value.

5. The method of claim 1, further comprising adjusting an operating state of the disconnect clutch in response to a driving surface coefficient of friction.

6. The method of claim 5, further comprising additionally adjusting the operating state of the disconnect clutch in response to vehicle speed.

7. A system for operating a hybrid powertrain, comprising:
   an engine;
   a driveline integrated starter generator (DISG);
   a disconnect clutch positioned in a driveline between the engine and the DISG; and
   a controller including executable instructions stored in non-transitory memory, which when executed by a processor, causes the processor to adjust a state of the disconnect clutch in response to vehicle wheel slip, inhibit automatic engine stopping of the engine in response to an amount of time a transmission is in a gear being less than a threshold time, and adjust the engine to a speed control mode or a torque control mode based on a battery state of charge in response to wheel slip.

8. The system of claim 7, further comprising additional executable instructions stored in the non-transitory memory to open the disconnect clutch in response to wheel slip.

9. The system of claim 7, further comprising additional executable instructions stored in the non-transitory memory to adjust the DISG to contemporaneously reduce wheel slip and charge an energy storage device.

10. The system of claim 7, further comprising additional executable instructions stored in the non-transitory memory to adjust transmission input shaft torque to an amount that reduces wheel slip to less than a threshold amount.

11. The system of claim 7, further comprising additional executable instructions stored in the non-transitory memory to close the driveline disconnect clutch in response to an adjusted transmission input torque being equal to a desired torque after operating the engine in the speed control mode.

12. The system of claim 7, further comprising additional executable instructions stored in the non-transitory memory to adjust torque output from the DISG to reduce wheel slip to less than a threshold amount when the engine is operated in the speed control mode.

* * * * *